United States Patent [19]

Stokes

[11] 4,125,066
[45] Nov. 14, 1978

[54] APPARATUS FOR FACILITATING SEPARATION OF PEEL FROM PRODUCE

[75] Inventor: Thomas P. Stokes, East Wenatchee, Wash.

[73] Assignee: Tree Top, Inc., Wenatchee, Wash.

[21] Appl. No.: 763,920

[22] Filed: Jan. 31, 1977

[51] Int. Cl.² ............................................. A23N 7/01
[52] U.S. Cl. ..................................... 99/534; 99/584
[58] Field of Search ................. 99/516, 534, 535, 536, 99/483, 584, 629, 630, 634; 134/133, 134, 68; 15/3.19

[56] References Cited

U.S. PATENT DOCUMENTS

| 790,580 | 5/1905 | Kurtz | 134/134 X |
|---|---|---|---|
| 1,724,639 | 8/1929 | Burch et al. | 134/68 X |
| 2,537,053 | 1/1951 | Hemmeter | 99/534 X |
| 2,822,842 | 2/1958 | Morici | 99/534 |
| 3,049,986 | 8/1962 | Weber | 99/534 |
| 3,447,544 | 6/1969 | Vergara | 134/68 X |
| 3,502,128 | 3/1970 | Lawson | 99/584 X |

Primary Examiner—Philip R. Coe

Attorney, Agent, or Firm—Seed, Berry, Vernon & Baynham

[57] ABSTRACT

An apparatus for facilitating separation of peel from fruit in which the fruit is sequentially loaded into a plurality of pockets extending around the circumference of a vertical, rotating reel. The reel is mounted in a tank holding a caustic treating solution so that the fruit in the pockets is carried downwardly into the solution as the reel rotates. Incoming fruit is conveyed into a receiving tank containing the solution so that the solution cushions the fall of the fruit from the conveyor. The solution is heated and recirculated into the receiving tank thereby carrying the fruit over a weir and into the pockets in the reel. The pockets are formed by a plurality of spaced apart paddles or dividers extending from a relatively large hub to the outer periphery of the wheel. The inner portions of the paddles are perforated so that the solution flows between pockets and through the fruit which, being less dense than the solution, is urged toward the hub by buoyant forces. The caustic solution passing about the fruit agitates the fruit to assist in loosening the peel from the fruit.

10 Claims, 6 Drawing Figures

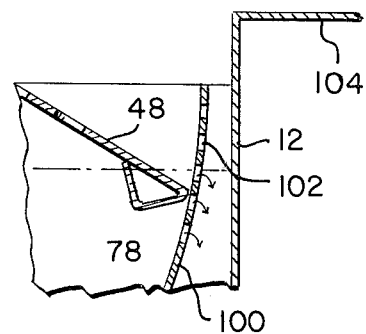
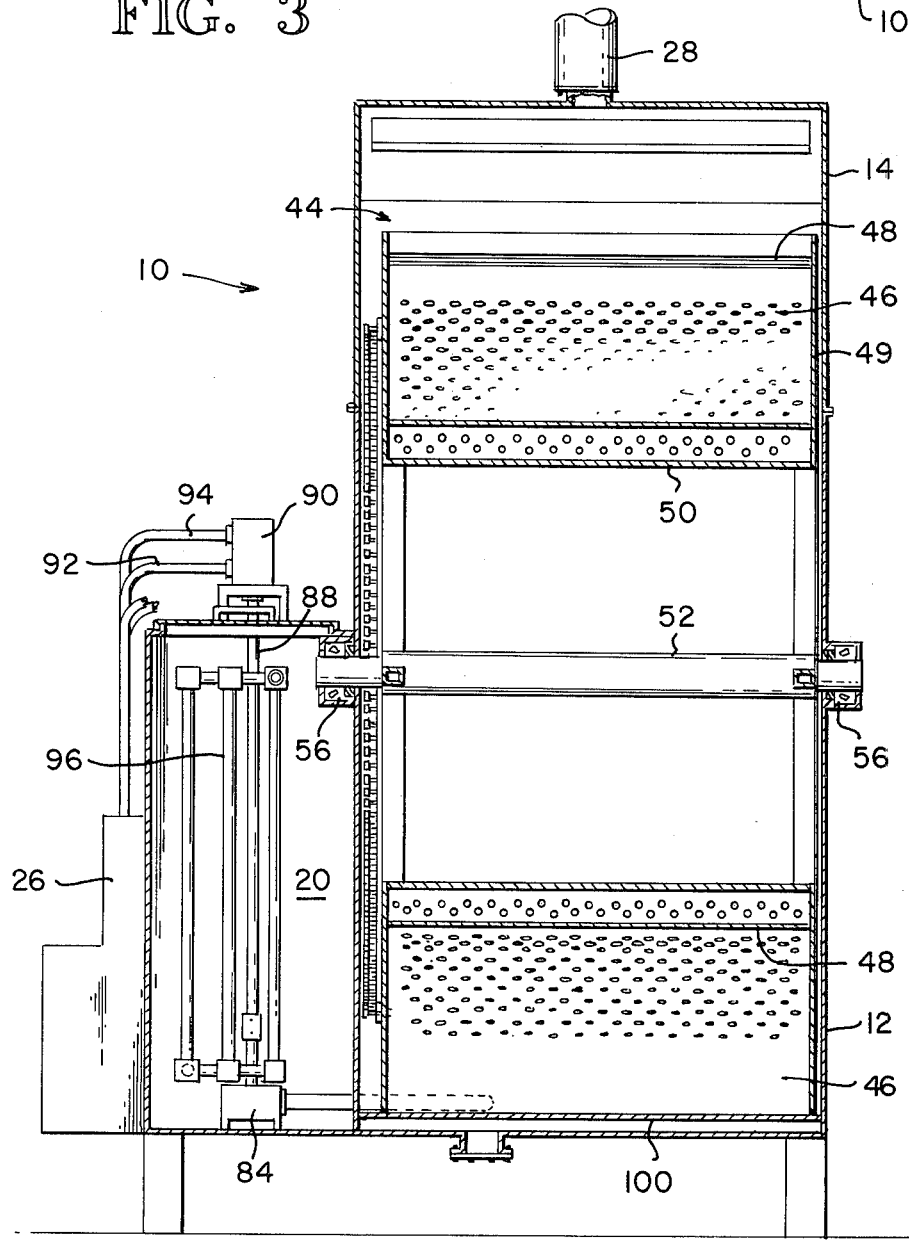

APPARATUS FOR FACILITATING SEPARATION OF PEEL FROM PRODUCE

BACKGROUND OF THE INVENTION

1. Field of the Invention

This invention relates to food processing and, more particularly, to an apparatus for treating fruit with a caustic solution to facilitate separation of peel from the fruit.

2. Description of the Prior Art

Utilization of fruit for certain purposes requires that the peel be separated from the fruit as a part of the processing operation. This operation has been somewhat difficult to mechanize, yet the cost of manually removing the peel would make the cost of peeled fruit prohibitive. Consequently there is a need for an apparatus which is capable of automatically removing peel at a high rate of speed. Although attempts have been made in the past to utilize a caustic treating solution to loosen the peel from the fruit, such techniques have generally carried the fruit through the solution on an elongated conveyor which does not sufficiently agitate the fruit to rapidly loosen the peel. Furthermore, these conveyors do not carry a sufficient volume of fruit thereby limiting the capacity of this technique, and the conveyors generally require a great deal of maintenance and are difficult to clean.

SUMMARY OF THE INVENTION

It is an object of the invention to provide an apparatus for effectively loosening peel from fruit in order to facilitate peel separation.

It is another object of the invention to provide an apparatus capable of treating fruit to facilitate peel separation at a relatively high rate of speed and increased volume.

It is still another object of the invention to provide an apparatus for facilitating the separation of peel from fruit which does not unduly damage the fruit.

These and other objects of the invention are provided by an apparatus having a multi-pocketed reel rotating about a horizontal axis which carries the fruit down and through a caustic treating solution. The pockets are formed by spaced apart, perforated paddles which allow the solution to flow through the paddles and through the fruit contained in each pocket thereby agitating and moving the fruit so that the solution is extremely effective in loosening the peel. As the reel rotates the fruit is submerged in the treating solution for at least 200° of rotation of the reel to provide a relatively long retention time of the fruit in the solution and substantially increases the quantity of fruit which may be processed in a given period of time. Incoming fruit is conveyed into a receiving tank containing the solution so that the solution cushions the fall of the fruit to minimize damage. The solution is continuously heated and recirculated into the receiving tank thereby carrying the fruit over a weir and into the pockets in the rotating reel. The reel has a relatively large hub so that the radial dimension of the pockets is about half the radius of the reel and fruit loaded into the pockets floats in the pockets in the area adjacent the hub. Thus the inventive apparatus is capable of effectively loosening peel at a relatively high rate of speed while minimizing damage to the fruit.

BRIEF DESCRIPTION OF THE DRAWINGS

FIG. 3 is a cross-sectional view of the fruit treating apparatus taken along the line 3—3 of FIG. 2.

FIG. 4 is a side elevational view illustrating the manner in which solution is drained from the pockets in the reel at the discharge end of the tank.

DETAILED DESCRIPTION OF THE INVENTION

Figure 1:
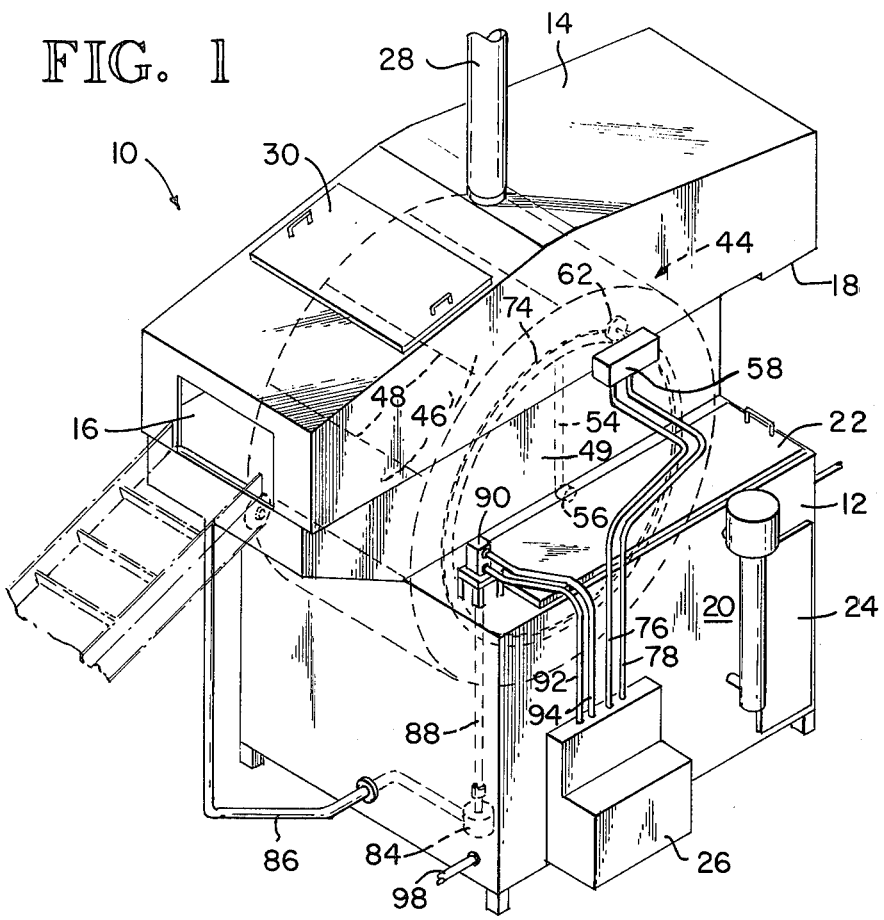
FIG. 1 is an isometric view of the inventive fruit treating apparatus.
Figure 2:
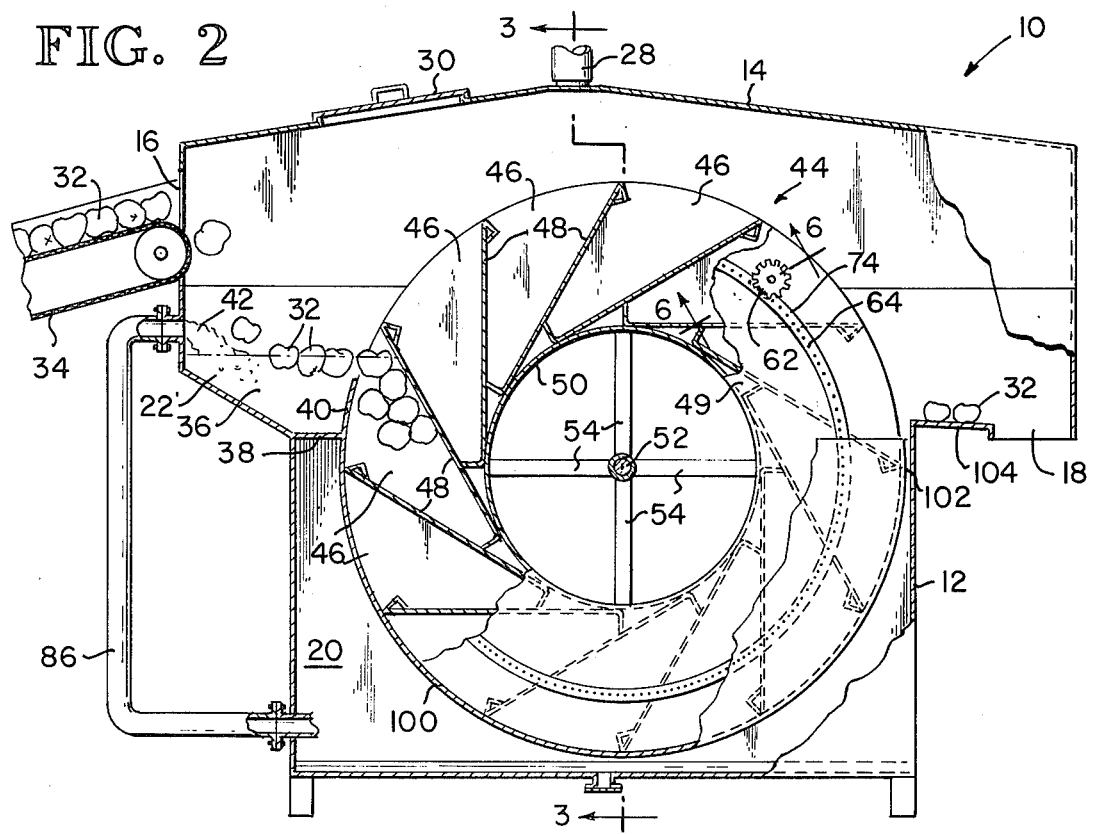
FIG. 2 is a cross-sectional view of the apparatus taken along the central, longitudinal axis of the apparatus.

The apparatus 10 for treating fruit is illustrated in FIGS. 1-3 includes a holding tank having a rectangular lower portion 12 and an elongated upper portion 14 having an inlet 16 and an outlet 18. The lower tank 12 contains a caustic treating solution 20 having a concentration which will vary according to the particular application, but in one operational embodiment the concentration for processing apples is approximately 14%. Access is provided to the lower tank 12 through a pair of removable doors 22,24 for inspection and cleaning. A hydraulic power unit 26, described in greater detail hereinafter, is secured to the outside wall of the tank lower portion 12.

The elongated upper portion 14 is vented through a pipe 28, and its interior is accessible through an inspection and cleaning door 30. The upper portion 14 is not provided for the purpose of containing the caustic treating solution, but rather is provided to prevent noxious fumes from contaminating the air inside the building housing the treating apparatus 10.

As best illustrated in FIG. 2, the fruit 32, such as apples, is preferably pre-washed and is conveyed through the inlet 16 by a conventional conveyor 34 and is dropped into the caustic treating solution 20 in a receiving tank 36 formed by horizontal plate 38 and a weir 40. The treating solution 22 in the receiving tank 36 cushions the fall of the fruit 32 thereby minimizing damage to the fruit. It should be noted that the specific gravity of the fruit 32 is less than the specific gravity of the solution 22 so that the fruit 32 floats near the surface of the solution 20. Recirculated solution 42 is discharged into the receiving tank 36 thereby carrying the fruit 32 over the weir 40 and, as explained hereinafter, into one of several pockets 46 extending along the circumference of a rotating reel 44. The recirculation rate will vary depending on the specific application of the device, but in one operational embodiment the solution is recirculated at a rate of 450 gallons per minute.

Figure 6:
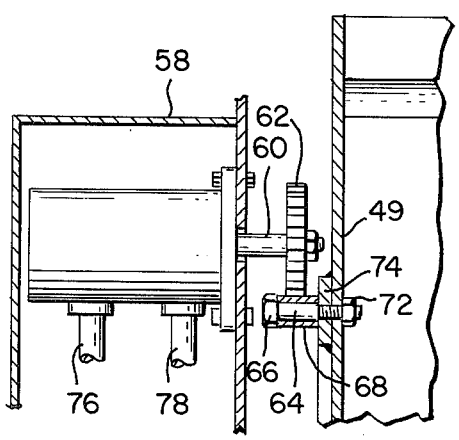
FIG. 6 is a cross-sectional view further illustrating the drive mechanism for the rotating reel.

The rotating reel 44 includes a plurality of pockets 46 formed by a plurality of spaced apart paddles 48 extending between sidewalls 49 from a relatively large hub 50 to the outer periphery of the reel 44. The paddles 48 intersect the hub at an angle so that the pockets 46 extend downwardly at the inlet 16 end of the tank 10 so that the fruit 32 is retained in the pockets 46. The hub 50 displaces the inner end of the pockets 46 outwardly so that the radial dimension of the pockets 48 is substantially less than the radius of the wheel 44. The hub 50 is supported on a cylindrical shaft 52 by radial spokes 54 extending between the shaft 52 and the hub 50. The shaft 52 is rotatably secured to the tank 12 by conventional sealed bearings 56 (FIGS. 1 and 3). The reel 44 is rotated by power means, also illustrated in FIG. 6, which includes a hydraulic motor 58 having an output shaft 60 rotating a sprocket 62 which engages a plurality of lugs 64 equally spaced apart along a sidewall 49 of the reel 44 at a constant distance from the shaft 52. The lugs 64 may be formed by bolts 66 (FIG. 6) extending through sleeves 68 and fastened to the sidewall 49 of the reel 44 by a nut 72. The bolt 64 also passes through a reinforcing ring 74 extending around the sidewall of the reel 44. Power is supplied to the hydraulic motor 58 through supply and return lines 76, 78, respectively, extending to the hydraulic power supply 26. The speed at which the reel rotates will of course depend upon the specific application of the device including treating solution concentration and temperature, but in one operational embodiment the reel 44 rotates one revolution every four minutes.

Figure 5:
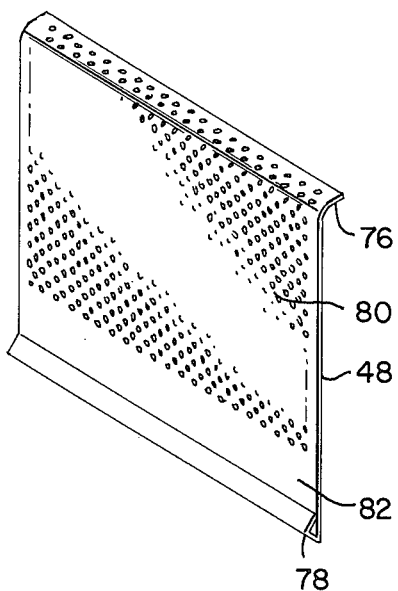
FIG. 5 is an isometric view of a paddle which forms the fruit-receiving pockets in the wheel.

The structure of the paddles 48 is illustrated in further detail in FIG. 5. Each of the paddles 48 include a right angle flange 76 which closes the inner end of the pockets 46 and a triangular reinforcing strip 78 is provided at the other end of the paddle 48. The inner portion of the paddel 48 is perforated with holes 80 while the outer portion 82 is solid. The perforations 80 allow fluid flow through the paddles 48 as the reel 44 rotates in the solution 20. Since only the inner portions of the paddle 48 contain perforations 80, the flow of solution through the pockets 46 is most prevalent toward the hub 50.

During operation of the apparatus 10 the solution 20 is recirculated as mentioned above by a submersible fluid pump 84 which conveys the caustic treating solution 20 through a conduit 86 and discharges it into the chute 36 as explained above. The fluid pump 84 is driven through a shaft 88 by a conventional hydraulic motor 90 connected to the hydraulic power supply 26 by supply and return lines 92, 94, respectively.

As best illustrated in FIG. 3, the solution 20 in the lower tank 12 is heated by a radiator 96 formed by a plurality of pipes which communicate with a steam supply through supply pipe 98. The temperature of the treating solution will, of course, depend upon the specific application of the device, but in one operational embodiment the temperature has been kept at approximately 150° F.

In operation the fruit 32 is discharged into the receiving tank 36 and the recirculated solution 42 carries the fruit 32 over the weir 40 into the pocket 46 adjacent the upper edge of the weir 40. The reel rotates in a counter-clockwise direction as illustrated in FIG. 2 thereby carrying the fruit in the pocket 46 into the solution 20 which is below the level of the solution 22 in the receiving tank 36. A fixed cylindrical plate 100 extending about the periphery of the reel 44 maintains the fruit 32 in the pocket 46. The fruit 32 in the pockets 46 is urged toward the hub 50 by buoyant forces since the specific gravity of the solution is greater than the specific gravity of the fruit. Since the inner portions of the paddles 48 are perforated, solution flows through the inner portions of the paddles 48 and through the fruit thereby agitating the fruit and facilitating separation of the peel from the fruit. Toward the discharge end of the tank 12 the fruit is lifted from the treating solution and, before the fruit 32 is discharged from the reel 44, the solution is drained from the pockets through a perforated portion 102 of the fixed plate 100 as best illustrated in FIG. 4. The lower edge of the perforated portion 102 is positioned above the level of the treating solution so that all of the treating solution has been removed from the pockets 46 before the fruit 32 is discharged onto a shelf 104 adjacent the outlet 18. The fruit is then conveyed to a peel removing device such as a scrubber or high pressure water jets. The inventive fruit processing apparatus thus effectively loosens the peel from fruit at a relatively high volume while minimizing damage to the fruit.

The embodiments of the invention in which a particular property or privilege is claimed are defined as follows:

1. A device for facilitating separation of peel from product, comprising:
    a liquid holding tank having an infeed end and a discharge end, said tank containing a treating solution,
    a holding reel suspended for rotation in said tank through said treating solution, said reel having a cylindrical hub and a series of open-ended pockets spaced around said cylindrical hub and extending outwardly therefrom between a pair of annular sidewalls,
    infeed means for sequentially loading said product into said pockets as each of said pockets rotates past a fixed loading point, said infeed means including an infeed receiving tank holding a quantity of treating solution into which product is conveyed, said receiving tank including a weir over which the treating solution and product spills to sequentially load each pocket with product and treating solution as said pocket rotates past said weir; powered means for rotating said reel such that product contained in said pockets is carried downwardly into said treating solution; and outfeed means for sequentially unloading product from said pockets as each of said pockets rotates past a fixed discharge point.

2. The separating device of claim 1, further including a fixed plate mounted in said tank having a diameter corresponding essentially to the outer diameter of said reel for covering the open ends of said pockets during passage of said pockets through said treating solution, said fixed plate projecting upwardly adjacent said loading point to form said weir.

3. The separating device of claim 1, wherein said treating solution is recirculated with said recirculated solution being discharged into said receiving tank so that said recirculated solution flows over said weir carrying said product into said pockets.

4. The separating device of claim 1 wherein said reel includes lugs extending laterally from one of said sidewalls a fixed distance from the axis of said hub, and wherein said powered means for rotating said reel includes means rotating a sprocket which meshes with said lugs on said reel.

5. The separating device of claim 1, including means for heating and maintaining the temperature of said treating solution in said tank at a predetermined level.

6. The separating device of claim 1, further including means for removing fumes and gases emanating from said holding tank.

7. The separating device of claim 1, wherein said pockets are angled with respect to radials of said reel with said pockets extending upwardly at said infeed end so that product is retained in said pockets at said infeed end, and said pockets extend downwardly at said discharge end so that product is discharged from said pockets at said discharge end.

8. The separating device of claim 1, further including a fixed plate mounted in said tank having a diameter corresponding essentially to the outer diameter of said reel for covering the open ends of said pockets during passage of said pockets through said treating solution, said plate being perforated adjacent said discharge point for allowing said treating solution to drain from said pockets before said product is unloaded from said pockets.

9. A device for facilitating separation of peel from product, comprising:

a liquid holding tank having an infeed end and a discharge end, said tank containing a treating solution, said treating solution having a density greater than the density of said product, a holding reel suspended for rotation in said tank through said treating solution, said reel having a cylindrical hub and a series of open-ended pockets spaced around said cylindrical hub and extending outwardly therefrom between a pair of annular sidewalls, said pockets being formed by a plurality of spaced apart paddles extending between said hub and the outer periphery of said sidewalls, each of said paddles having a perforated inner portion and a non-perforated outer portion to allow said treating solution to flow sequentially through the product within the inner portion of said pockets as said reel rotates thereby agitating said product within said pockets, infeed means for sequentially loading said product into said pockets as each of said pockets rotates past a fixed loading point, powered means for rotating said reel such that said product contained in said pockets is carried downwardly into said treating solution, and outfeed means for sequentially unloading product from said pockets as each of said pockets rotates past a fixed discharge point.

10. The separating device of claim 9 further including a fixed plate mounted in said tank having a diameter corresponding essentially to the outer diameter of said reel for covering the open ends of said pockets during passage of said pockets through said treating solution, said plate being perforated adjacent said discharge point for allowing said treating solution to drain from said pockets before said product is unloaded from said pockets.

* * * * *